United States Patent [19]

Kawanaka et al.

[11] Patent Number: 5,334,683
[45] Date of Patent: Aug. 2, 1994

[54] ACRYLATE POLYMER ELASTOMER AND VULCANIZABLE COMPOSITION CONTAINING THE SAME

[75] Inventors: Takafumi Kawanaka; Takeshi Ohishi, both of Yokohama; Masahiro Shimizu, Yamato, all of Japan

[73] Assignee: Nippon Zeon Co., Ltd., Tokyo, Japan

[21] Appl. No.: 40,010

[22] Filed: Mar. 30, 1993

[30] Foreign Application Priority Data

Mar. 31, 1992 [JP] Japan .................................. 4-106167

[51] Int. Cl.$^5$ .................. C08F 220/18; C08F 220/40; C08F 220/32; C08F 220/22
[52] U.S. Cl. ............................... 526/273; 526/292.6; 526/320; 526/325; 526/318.41; 526/318.42
[58] Field of Search ................... 526/320, 321, 292.6, 526/325, 318.41, 318.42, 273

[56] References Cited

U.S. PATENT DOCUMENTS

| | | | |
|---|---|---|---|
| 4,517,348 | 5/1985 | Takahashi et al. | 526/273 |
| 4,883,899 | 11/1989 | Muramoto et al. | 560/14 |
| 4,975,508 | 12/1990 | Kamezawa et al. | 526/273 |
| 5,026,807 | 6/1991 | Ohira et al. | 526/321 |

FOREIGN PATENT DOCUMENTS

| | | |
|---|---|---|
| 63-264612 | 11/1988 | Japan . |
| 123809 | 5/1989 | Japan . |
| 132611 | 5/1989 | Japan . |
| 135811 | 5/1989 | Japan . |
| 299808 | 12/1989 | Japan . |
| 22313 | 1/1990 | Japan . |

OTHER PUBLICATIONS

CA 118(16): 149242t.
CA 116(24): 237443y.

*Primary Examiner*—Mark Nagumo
*Attorney, Agent, or Firm*—Sherman and Shalloway

[57] ABSTRACT

There are provided an acrylate polymer elastomer containing a particular acrylic ester unit as a constitutive component, and a vulcanizable composition comprising the elastomer and a vulcanizing agent.

The acrylate polymer elastomer is obtained by copolymerizing
(a) 45 to 89.9 wt. % of a monomer represented a by the formula $$CH_2=CH-\underset{\underset{O}{\|}}{C}-O-R^1$$

wherein $R^1$ represents an alkyl group having 1 to 8 carbon atoms, and/or a monomer represented by the formula $$CH_2=CH-\underset{\underset{O}{\|}}{C}-O-R^2-O-R^3$$

wherein $R^2$ represents an alkylene group having 1 to 8 carbon atoms and $R^3$ represents an alkyl group having 1 to 8 carbon atoms,
(b) 10 to 35 wt. % of a monomer represented by the formula t,0012
wherein $R^4$ represents a hydrogen atom or a methyl group, $R^5$ represents a hydrogen atom or a hydrocarbon group having 1 to 4 carbon atoms, and n represents an integer of 1 to 5,
(c) 0.1 to 10 wt. % of crosslinkable monomer, and
(d) 0 to 30 wt. % of a monoethylenic unsaturated monomer copolymerizable with the above
(a), (b) and (c) components.

A vulcanizate obtained from the vulcanizable composition has improved low temperature resistance and oil resistance and is excellent in the balance of both natures.

14 Claims, No Drawings

ACRYLATE POLYMER ELASTOMER AND VULCANIZABLE COMPOSITION CONTAINING THE SAME

This invention relates to an acrylate polymer elastomer and a vulcanizable composition containing the same. More detailedly, this invention relates to an acrylate polymer elastomer giving a vulcanizate having oil resistance, heat resistance and low temperature resistance suitable for uses as industrial material, and a vulcanizable composition therefrom.

Acrylate polymer elastomers are polymer elastomers containing an acrylic ester as a main component, known as rubbers excellent generally in heat resistance, oil resistance and ozone resistance, and used as molding materials such as oil seals, O-rings and packing.

In recent years, in accordance with heightened performance of automobiles, it is impossible to satisfy required performance by usual levels of heat resistance, oil resistance and low temperature resistance, and development of rubber having a further high function is desired. For enhancement of the above physical properties of rubber, alteration of monomer composition, alteration of the quantity and kind of the compounding ingredient, etc. have been mainly tried, but it was impossible to satisfy requirements on all of heat resistance, oil resistance and low temperature resistance.

For example, as a process for improvement of low temperature resistance without soiling heat resistance and oil resistance, there is a process which comprises copolymerizing ethyl acrylate with a certain (meth)acrylic ester (Japanese Laid-Open Patent Publication No. 264612/1988, Japanese Laid-Open Patent Publication No. 123809/1989, Japanese Laid-Open Patent Publication No. 132611/1989, Japanese Laid-Open Patent Publication No. 135811/1989, Japanese Laid-Open Patent Publication No. 299808/1989 and Japanese Laid-Open Patent Publication No. 22313/1990). However, in this process, the balance of low temperature

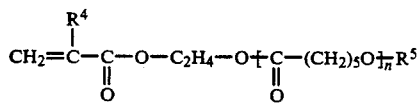

and oil resistance is still insufficient, and there was a problem in the point of compression set.

The object of this invention lies in improving these drawbacks in prior art.

The present inventors intensely studied for attaining the above object, and found that an acrylate polymer elastomer containing a certain acrylic ester unit has improved oil resistance and low temperature resistance without spoiling inherent good heat resistance and is excellent in the balance of both natures.

Thus, according to this invention, there are provided [I] an acrylic copolymer elastomer having a Mooney viscosity [$ML_{1+4}$, 100° C.] of 10 to 100 obtained by copolymerizing (a) 45 to 89.9 wt. % of a monomer represented by the formula

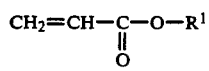 (1)

wherein $R^1$ represents an alkyl group having 1 to 8 carbon atoms, and/or a monomer represented by the formula

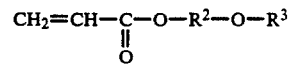 (2)

wherein $R^2$ represents an alkylene group having 1 to 8 carbon atoms and $R^3$ represents an alkyl group having 1 to 8 carbon atoms, (b) 10 to 45 wt. % of a monomer represented by the formula

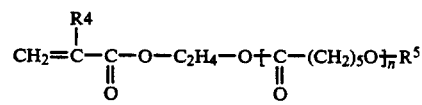 (3)

wherein $R^4$ represents a hydrogen atom or a methyl group, $R^5$ represents a hydrogen atom or a hydrocarbon group having 1 to 4 carbon atoms, and n represents an integer of 1 to 5, (c) 0.1 to 10 wt. % of crosslinkable monomer, and
(d) 0 to 30 wt. % of a monoethylenic unsaturated monomer copolymerizable with the above (a), (b) and (c) components, and

[II] a vulcanizable composition comprising the elastomer and a vulcanizing agent.

As examples of monomers represented by the above formula (1) among monomers of component (a) used in this invention, there can be mentioned alkyl acrylates having an alkyl group of 1 to 8 carbon atoms, preferably 2 to 4 carbon atoms such as methyl acrylate, ethyl acrylate, propyl acrylate, butyl acrylate, hexyl acrylate, cyclohexyl acrylate and octyl acrylate.

As examples of monomers represented by the above formula (2) among monomers of component (a) used in this invention, there can be mentioned alkoxyalkyl acrylates having an alkoxy group of 1 to 8 carbon atoms such as methoxymethyl acrylate, methoxyethyl acrylate, ethoxyethyl acrylate and butoxyethyl acrylate.

The range of composition of these formula (1) alkyl acrylates or formula (2) alkoxyalkyl acrylates is 45 to 89.9 wt. %, preferably 60 to 89.9 wt. % based on the weight of the total monomer units. Further, when an alkyl acrylate and an alkoxyalkyl acrylate are used together, it is preferable that the alkoxyalkyl acrylate is 20 to 50 wt. %.

The monomer of component (b) used in this invention is an acrylic ester or methacrylic ester represented by the above formula (3) As specific examples of $R^5$ there can be mentioned hydrogen, a methyl group, an ethyl group, a n-propyl group, an isopropyl group, a n-butyl group, an isobutyl group, a tert-butyl group, etc.

The use quantity of these formula (3) component (b) monomers is 10 to 45 wt. %, preferably 10 to 35 wt. % based on the weight of the total monomer units. In case of 10 wt. % or less the effect of improvement of low temperature resistance cannot be obtained, and in case of 40 wt. % or more heat resistance and tensile strength lower.

As crosslinkable monomers of components (c) in this invention, there can, usually, be used active chlorine group-containing unsaturated monomers, epoxy group-containing unsaturated monomers, carboxyl group-containing unsaturated monomers, diene monomers, etc.

As examples of active chlorine group-containing unsaturated monomers, there can be mentioned vinyl chloroacetate, vinylbenzyl chloride, allyl chloroacetate, vinyl chlorobutyrate, 2-chloroethyl acrylate, 3-chloropropyl acrylate, 4-chlorobutyl acrylate, 2-chloroethyl methacrylate, 2-chloroethyl vinyl ether, chloromethyl vinyl ketone, 1-chloro-2-butenyl acrylate, 5-chloromethyl-2-norbornene, 5-chloroacetoxymethyl-2-norbornene, 5-($\alpha,\beta$-dichloropropionylmethyl)-2-norbornene, etc.

As examples of epoxy group-containing unsaturated monomers, there can be mentioned unsaturated glycidyl esters such as glycidyl acrylate, glycidyl methacrylate, itaconic acid diglycidyl ester, butenetricarboxylic acid triglycidyl ester and p-styrenecarboxylic glycidyl ester; unsaturated glycidyl ethers such as vinyl glycidyl ether, allyl glycidyl ether and methacryl glycidyl ether; etc.

As examples of carboxyl group-containing unsaturated monomers, there can be mentioned unsaturated carboxylic acids such as acrylic acid, methacrylic acid, itaconic acid, maleic acid, fumaric acid, 2-norbornene-5-carboxylic acid, maleic anhydride and monomethyl maleate.

As examples of diene monomers, there can be mentioned butadiene, isoprene, cyclopentadiene, methylcyclopentadiene, ethylidenenorbornene, vinylidenenorbornene, etc.

The crosslinkable monomers can be used alone or in combination of two or more of them. Further, the use quantity of this crosslinkable monomer is 0.1 to 10 wt. %, preferably 0.5 to 5 wt. % based on the total weight of monomers (a), (b), (c) and (d). When the use quantity is 0.1 wt. % or less, sufficient crosslinkage effect cannot be obtained, and when it is 10 wt. % or more, the strength and elongation of the resultant acrylate polymer elastomer vulcanizate strikingly lower.

The monoethylenic unsaturated monomer of component (d) used in this invention is an optional component used according to necessity for improvement of the mechanical characteristics and oil resistance of the resultant acrylate polymer elastomer. As specific examples thereof, there can be mentioned monovinyl monomers such as acrylonitrile, vinyl acetate, styrene, $\alpha$-methylstyrene, acrylamide, vinyl chloride and acrylic acid; monovinylidene monomers such as methyl methacrylate, ethyl methacrylate, methacrylonitrile and vinylidene chloride; etc. The use quantity of this monoethylenic unsaturated monomer is 30 wt. % or less based on the weight of the total monomer units.

Polymerization reaction can be carried out by polymerizing the above monomer mixture according to a known process such as emulsion polymerization, suspension polymerization, solution polymerization or bulk polymerization using a usual radical initiator. Polymerization reaction can be carried out either by batch polymerization or by adding one or more monomer components continuously or intermittently during polymerization. Polymerization temperature is in the range of $-10°$ C. to 100° C., but preferably 2° to 80° C.

The vulcanizable composition of this invention can be prepared by mixing the thus prepared acrylate polymer elastomer with a vulcanizing agent and a vulcanization auxiliary. As the vulcanizing agent, there can be used a vulcanizing agent having hitherto been used on known acrylate polymer elastomers containing the above crosslinkable monomer as a copolymerization component. For example, in case of an elastomer wherein an active chlorine-containing unsaturated monomer is used as a copolymerization component, there can be used a combination of sulfur or a sulfur donator with a fatty acid metal soap, or a combination of a dithiocarbamate salt or its derivative with trithiocyanuric acid. In case of an elastomer wherein an epoxy group-containing monomer is used as a copolymerization component, there is used ammonium benzoate, dithiocarbamate salt or a combination of isocyanuric acid with a quaternary ammonium salt. In case of an elastomer wherein a carboxyl group-containing monomer is used as a copolymerization component, there can be used a polyepoxy compound, or a combination of a polyamine compound with an onium salt. In case of an elastomer wherein a diene monomer is used as a copolymerization component, there can be used a sulfuric vulcanizing agent or an organic peroxide vulcanizing agent.

It is possible to compound in the acrylic polymer elastomer of this invention various compounding agents used usually in the rubber industry such as a reinforcing agent, a filler, a plasticizer and an agent resister. Although the curing temperature of the elastomer is in the range of about 140° to 220° C., it is preferable that vulcanization temperature is about 160 to 200° C. Vulcanization time depends on the temperature, but generally 30 seconds to 60 minutes.

In a vulcanizate from a vulcanizable composition containing the acrylate polymer elastomer of this invention, while good heat resistance and ozone resistance as advantages of the acrylate polymer elastomer are maintained, low temperature resistance which has not adequately been satisfied in usual acrylate polymer elastomers is enhanced up to a practical level and oil resistance is enhanced, too. Namely, in the vulcanizate, a measured value in an impact brittleness test (brittle temperature) as a measure of low temperature resistance is $-35°$ C. or less, and a measured value in the JIS #3 oil immersion test (volume change) as a measure of oil resistance is 30wt. % or less, and the vulcanizate is excellent in their balance. Therefore, the vulcanizable composition of this invention is useful for uses in many fields where heat resistance, oil resistance and ozone resistance and further low temperature resistance are required. As such uses, there can be mentioned various rubber parts such as gaskets, hoses, conveyor belts, puckings, bearing seals and oil seals.

This invention is specifically described below according to examples.

Examples 1 to 5 and comparative Examples 1 to 3

A separable flask having a capacity of 2 liters was equipped with a thermometer, a stirrer, a nitrogen introducing tube and a pressure reducing apparatus, and each of mixtures of monomers having compositions shown in Table 2, respectively was polymerized. Namely, first, the components of (I) were supplied in the flask, the mixture in the flask was adjusted to pH 7, the temperature in the system was made 5° C. under stirring, deaeration and replacement with nitrogen were repeated to remove adequately oxygen in the system, and the component of (II) were added to initiate polymerization. Polymerization temperature was 5° C. and reaction time was about 16 hours. Polymerization conversion was in the range of 94 to 98 wt. %. After completion of polymerization, the polymerization product was salted out, washed adequately with water and dried for 24 hours in a vacuum desiccator to obtain desired acrylate copolymer elastomers A to H.

TABLE 1

| (Polymerization prescription - gram) | |
|---|---|
| (I) Water | 1000 |
| Sodium dodecylbenzenesulfonate | 20 |
| Sodium naphthalenesulfonate | 10 |
| Sodium sulfate | 3 |
| Tetrasodium ethylenediaminetetraacetate | 0.2 |
| Sodium ferric ethylenediaminetetraacetate | 0.005 |
| Monomer mixture (Table 2) | 1000 |
| (II) $Na_2S_2O_4$ | 0.2 |
| Sodium formaldehydesulfoxylate | 0.2 |
| p-Menthane hydroperoxide | 0.1 |

TABLE 2

(Monomer supply composition - percent by weight)

| Composition of monomers | Acrylate copolymer elastomer | | | | | | | |
|---|---|---|---|---|---|---|---|---|
| | A | B | C | D | E | F | G | H |
| Ethyl acrylate | — | — | 6.3 | — | 6.3 | 35.0 | 5.0 | 5.0 |
| Butyl acrylate | 47.1 | 41.1 | 37.4 | 41.1 | 37.4 | 35.0 | 25.1 | 52.0 |
| Methoxyethyl acrylate | 31.4 | 27.4 | 24.8 | 27.4 | 24.8 | 23.5 | 18.4 | 41.5 |
| Acrylic ester (1) *1 | 20.0 | 30.0 | 30.0 | — | — | 5.0 | 50.0 | — |
| Acrylic ester (2) *2 | — | — | — | 30.0 | 30.0 | — | — | — |
| Vinyl chloroacetate | 1.5 | 1.5 | 1.5 | 1.5 | 1.5 | 1.5 | 1.5 | 1.5 |

*1: 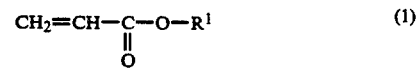

*2: 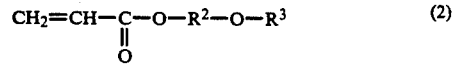

Compositions were prepared according to the compounding prescriptions of Table 3 using acrylate copolymer elastomers A to H, respectively.

Compounding was carried out by open rolls warmed to 50° to 60° C. The resultant compositions were press vulcanized at 170° C. for 20 minutes, and then heat treated in a gear oven at 170° C. for 4 hours. Vulcanization characteristics were measured on the resultant vulcanizates in accordance with JISK-6301, and the results were shown in Table 4.

It is seen from Table 4 that the vulcanizates of the acrylic copolymer elastomers of this invention are improved in low temperature resistance and oil resistance without soilage of heat resistance and ozone resistance which the vulcanizate of the acrylic polymer inherently has, and extremely excellent in their balance.

TABLE 3

| (Compounding prescription - part by weight) | |
|---|---|
| Acrylate copolymer elastomer | 100 |
| Stearic acid | 1 |
| MAF carbon | 60 |
| Sodium stearate | 3 |
| Potassium stearate | 0.5 |
| Sulfur | 0.25 |

TABLE 4

(vulcanization characteristics)

| | Examples of this invention | | | | | Comparative examples | | |
|---|---|---|---|---|---|---|---|---|
| | 1 | 2 | 3 | 4 | 5 | 1 | 2 | 3 |
| Acrylate copolymer elastomer | A | B | C | D | E | F | G | H |
| Copolymer Mooney viscosity ($ML_{1+4}$, 100° C.) | 32 | 30 | 35 | 28 | 26 | 32 | 35 | 32 |
| Compound Mooney viscosity ($ML_{1+4}$, 100° C.) | 65 | 65 | 68 | 68 | 66 | 53 | 62 | 52 |
| Vulcanization condition | | | | | | | | |
| Primary vulcanization (press) | 170° C. (20 minutes) | | | | | | | |
| Secondary vulcanization (oven) | 170° C. 4 hours | | | | | | | |
| Ordinary state physical properties | | | | | | | | |
| Tensil strength ($Kg/cm^2$) | 105 | 95 | 105 | 100 | 105 | 105 | 70 | 105 |
| Elongation (%) | 170 | 165 | 185 | 165 | 180 | 245 | 155 | 195 |
| 100% modulus ($Kg/cm^2$) | 54 | 52 | 61 | 53 | 55 | 52 | 68 | 59 |
| Hardness (JIS-A) | 66 | 63 | 65 | 66 | 62 | 63 | 72 | 65 |
| Heat resistance (175° C. × 168 hours, air heat deterioration) | | | | | | | | |
| Tensile strength change rate (%) | 20 | −19 | −19 | −18 | −19 | −10 | −35 | −34 |
| Hardness change rate (point) | +8 | +7 | +7 | +9 | +9 | +3 | +14 | +8 |
| Oil resistance (condition: JIS #3 oil, 150° C. × 70 hours) | | | | | | | | |
| Volume change rate (%) | +21.5 | +19.5 | +21.9 | +22.9 | +25.8 | +22.0 | +35.0 | +28.3 |
| Low temperature resistance | | | | | | | | |
| Impact brittleness test (°C.) | −37.5 | −38.0 | −36.5 | −37.5 | −36.0 | −25.0 | −45.5 | −32.0 |
| Compression set (%) (150° C. × 70 hours) | 42 | 47 | 48 | 42 | 43 | 37 | 75 | 43 |

We claim:

1. An acrylic copolymer elastomer having a Mooney viscosity ($ML_{1+4}$, 100° C.) of 10 to 100 obtained by copolymerizing
   (a) 45 to 89.9 wt. % of a monomer represented by the formula $$CH_2=CH-\underset{\underset{O}{\|}}{C}-O-R^1 \qquad (1)$$

wherein $R^1$ represents an alkyl group having 1 to 8 carbon atoms, or a monomer represented by the formula $$CH_2=CH-\underset{\underset{O}{\|}}{C}-O-R^2-O-R^3 \qquad (2)$$

wherein $R^2$ represents an alkylene group having 1 to 8 carbon atoms and $R^3$ represents an alkyl group having 1 to 8 carbon atoms, p1 (b) 10 to 45 wt. % of a monomer represented by the formula

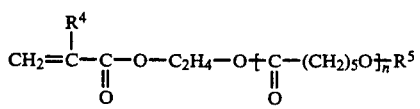 (3)

wherein $R^4$ represents a hydrogen atom or a methyl group, $R^5$ represents a hydrogen atom or a hydrocarbon group having 1 to 4 carbon atoms, and n represents an integer of 1 to 5,
(c) 0.1 to 10 wt. % of crosslinkable monomer, and
(d) 0 to 30 wt. % of a monoethylenic unsaturated monomer copolymerizable with the above (a), (b) and (c) components.

2. An acrylic copolymer elastomer having a Mooney viscosity ($ML_{1+4}$, 100° C.) of 10 to 100 obtained by copolymerizing
(a) 45 to 89.9 wt. % of a monomer represented by the formula

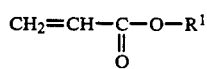 (1)

wherein $R^1$ represents an alkyl group having 1 to 8 carbon atoms, and/or a monomer represented by the formula

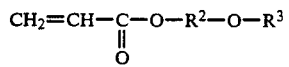 (2)

wherein $R^2$ represents an alkylene group having 1 to 8 carbon atoms and $R^3$ represents an alkyl group having 1 to 8 carbon atoms,
(b) 10 to 35 wt. % of a monomer represented by the formula

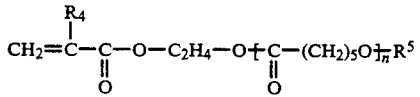 (3)

wherein $R^4$ represents a hydrogen atom or a methyl group, $R^5$ represents a hydrogen atom or a hydrocarbon group having 1 to 4 carbon atoms, and n represents an integer of 1 to 5,
(c) 0.1 to 10 wt. % of crosslinkable monomer, and
(d) 0 to 30 wt. % of a monoethylenic unsaturated monomer copolymerizable with the above (a), (b) and (c) components.

3. An acrylic copolymer elastomer having a Mooney viscosity ($ML_{1+4}$, 100° C.) of 10 to 100 obtained by copolymerizing
(a) 45 to 89.9 wt. % of a monomer represented by the formula

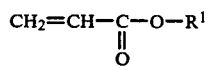 (1)

wherein $R^1$ represents an alkyl group having 1 to 8 carbon atoms, and a monomer represented by the formula

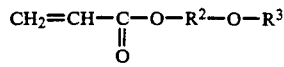 (2)

wherein R2 represents an alkylene group having 1 to 8 carbon atoms and $R^3$ represents an alkyl group having 1 to 8 carbon atoms,
(b) 10 to 45 wt. % of a monomer represented by the formula

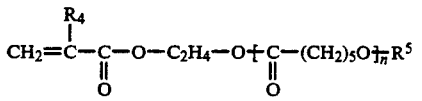 (3)

p1 wherein R4 represents a hydrogen atom or a methyl group, $R^5$ represents a hydrogen atom or a hydrocarbon group having 1 to 4 carbon atoms, and n represents an integer of 1 to 5,
(c) 0.1 to 10 wt. % of crosslinkable monomer, and
(d) 0 to 30 wt. % of a monoethylenic unsaturated monomer copolymerizable with the above (a), (b) and (c) components.

4. An acrylic copolymer elastomer having a Mooney viscosity ($ML_{1+4}$, 100° C.) of 10 to 100 obtained by copolymerizing
(a) 60 to 89.9 wt. % of a monomer represented by the formula

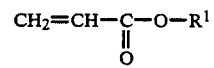 (1)

wherein $R^1$ represents an alkyl group having 2 to 4 carbon atoms, and a monomer represented by the formula

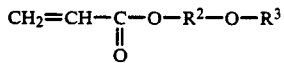 (2)

wherein R2 represents an alkylene group having 1 to 8 carbon atoms and R3 represents an alkyl group having 1 to 8 carbon atoms,
(b) 10 to 35 wt. % of a monomer represented by the formula

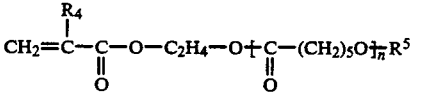 (3)

wherein $R^4$ represents a hydrogen atom or a methyl group, $R^5$ represents a hydrogen atom or a hydrocarbon group having 1 to 4 carbon atoms, and n represents an integer of 1 to 5,
(c) 0.5 to 5.0 wt. % of crosslinkable monomer, and
(d) 0 to 30 wt. % of a monoethylenic unsaturated monomer copolymerizable with the above (a), (b) and (c) components.

5. An acrylic copolymer elastomer of claim 1, 2, 3 or 4 wherein said crosslinkable monomer component (c) is selected from the group consisting of active chlorine group containing unsaturated monomer, epoxy group containing unsaturated monomer, carboxyl group containing unsaturated monomer and diene monomer.

6. An acrylic copolymer elastomer of claim 1, 2, 3 or 4 wherein said monomer represented by the formula (1)

is a member selected from the group consisting of ethyl acrylate and butyl acrylate.

7. An acrylic copolymer elastomer of claim 1, 2, 3 or 4 wherein said monomer represented by the formula (2) is methoxyethyl acrylate.

8. An acrylic copolymer elastomer of claim 1, 2, 3 or 4 wherein $R^5$ is hydrogen.

9. An acrylic copolymer elastomer of claim 1, 2, 3 or 4 wherein the Mooney viscosity ($ML_{1+4}$ 100° C.) is from 26 to 35.

10. An acrylic copolymer elastomer of claim 1, 2, 3 or 4 wherein said monomer represented by the formula (2) is in an amount of 20 to 50 wt. %.

11. An acrylic copolymer elastomer of claim 1, 2, 3 or 4 wherein said cross-linkable monomer component (c) is selected from the group consisting of vinyl chloro-acetate and glycidal methacrylate.

12. A rubber sealing member comprising the acrylic copolymer elastomer of claim 1, 2, 3 or 4.

13. A rubber hose comprising the acrylic copolymer elastomer of claim 1, 2, 3 or 4.

14. A rubber gasket comprising the acrylic copolymer elastomer of claim 1, 2, 3 or 4.

* * * * *